United States Patent
Biermann

(10) Patent No.: US 6,926,635 B2
(45) Date of Patent: Aug. 9, 2005

(54) MULTI-SPEED TRANSMISSION

(75) Inventor: Eberhard Biermann, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/471,521

(22) PCT Filed: Mar. 27, 2002

(86) PCT No.: PCT/EP02/03437
§ 371 (c)(1),
(2), (4) Date: Sep. 2, 2003

(87) PCT Pub. No.: WO02/079672
PCT Pub. Date: Oct. 10, 2002

(65) Prior Publication Data
US 2004/0092357 A1 May 13, 2004

(30) Foreign Application Priority Data
Mar. 30, 2001 (DE) .......................... 101 15 986

(51) Int. Cl.⁷ ............................. F16H 3/44; F16H 37/02
(52) U.S. Cl. .................... 475/296; 475/214; 475/215; 475/218; 475/219; 475/284; 475/302; 475/343; 475/329; 475/330
(58) Field of Search ................................ 475/214–215, 475/218–219, 271, 284, 302, 343, 329–330, 311, 323

(56) References Cited

U.S. PATENT DOCUMENTS

| | | | | |
|---|---|---|---|---|
| 3,487,723 A | * | 1/1970 | Piot ........................ | 475/276 |
| 4,676,116 A | * | 6/1987 | Nerstad et al. ................ | 74/360 |
| 4,976,670 A | * | 12/1990 | Klemen ....................... | 475/278 |
| 5,106,352 A | | 4/1992 | Lepelletier .................. | 475/280 |
| 5,342,258 A | * | 8/1994 | Egyed ......................... | 475/281 |
| 5,509,865 A | * | 4/1996 | Hall, III ..................... | 475/340 |
| 5,520,588 A | * | 5/1996 | Hall, III ..................... | 475/218 |
| 5,593,358 A | * | 1/1997 | Frost .......................... | 475/218 |
| 6,565,470 B2 | * | 5/2003 | Ohkubo ....................... | 475/66 |
| 2004/0116238 A1 | * | 6/2004 | Ziemer ........................ | 475/296 |

FOREIGN PATENT DOCUMENTS

| | | | |
|---|---|---|---|
| DE | 199 49 507 A1 | 4/2001 | ............ F16H/3/66 |
| EP | 0 433 619 B1 | 10/1990 | ............ F16H/3/66 |
| JP | 61124747 A | 6/1986 | ............ F16H/3/66 |

* cited by examiner

Primary Examiner—Tisha Lewis
(74) Attorney, Agent, or Firm—Davis & Bujold, P.L.L.C.

(57) ABSTRACT

A multi-speed transmission with an input shaft (1) and an output shaft (2) with two spur gear speeds (ST1, ST2) that are connected tightly on the input side with the input shaft (1) and generate two output rotational speeds (n1, n2), with a main gearset that is connected with the output shaft (2) and is constructed as a two webbed four shaft transmission with two coupled, shiftable planetary gearsets (RS1, RS2) to which the output rotational speeds (n1, n2) of the spur gear speeds (ST1, ST2) are transferable through several shifting elements (A to E) through their selective closing to the clutch of at least six forward gears and can be shifted without group shifting. A total of six shifting elements (A to F) are provided. The output rotational speed (n1) of the first spur gear speed (ST1) is transferable through the sixth shifting element (F) to the second shaft of the main gearset, and at least eight forward gears and maximally two reverse gears are shiftable.

8 Claims, 3 Drawing Sheets

| Gear | Closed shifting elements | | | | | | Ratio | Gradation | Spread |
|---|---|---|---|---|---|---|---|---|---|
|  | A | B | C | D | E | F |  |  |  |
| 1 | O |   |   | O |   |   | 5,60 | 1,90 |   |
| 2 | O |   | O |   |   |   | 2,95 | 1,47 |   |
| 3 | O | O |   |   |   |   | 2,00 | 1,32 |   |
| 4 | O |   |   |   |   | O | 1,51 | 1,24 | 7,6 |
| 5 | O |   |   |   | O |   | 1,22 | 1,22 |   |
| 6 |   |   |   |   | O | O | 1,00 | 1,18 |   |
| 7 |   | O |   |   |   | O | 0,85 | 1,15 |   |
| 8 |   | O |   |   | O |   | 0,74 |   |   |
| R1 |   | O |   | O |   |   | -5,60 |   |   |
| R2 |   |   |   | O |   | O | -2,80 |   |   |

Static gear ratios:

$i\_0\_RS1 = -1,8$   $i\_ST1 = -1,0$
$i\_0\_RS2 = -2,8$   $i\_ST2 = -2,0$

| Gear | Closed shifting elements | | | | | | Ratio | Gradation | Spread |
|---|---|---|---|---|---|---|---|---|---|
| | A | B | C | D | E | F | | | |
| 1 | O | | | O | | | 5,60 | 1,90 | |
| 2 | O | | O | | | | 2,95 | 1,47 | |
| 3 | O | O | | | | | 2,00 | 1,32 | |
| 4 | O | | | | | O | 1,51 | 1,24 | 7,6 |
| 5 | O | | | | O | | 1,22 | 1,22 | |
| 6 | | | | | O | O | 1,00 | 1,18 | |
| 7 | | O | | | O | | 0,85 | 1,15 | |
| 8 | | O | | | O | | 0,74 | | |
| R1 | | O | | O | | | -5,60 | | |
| R2 | | | | O | | O | -2,80 | | |

Static gear ratios:

i_0_RS1 = -2,11   i_ST1 = -1,0
i_0_RS2 = -2,80   i_ST2 = -2,0

| Gear | Closed shifting elements | | | | | | Ratio | Gradation | Spread |
|---|---|---|---|---|---|---|---|---|---|
| | A | B | C | D | E | F | | | |
| 1 | O | | | O | | | 5,48 | 1,78 | |
| 2 | O | | O | | | | 3,07 | 1,54 | |
| 3 | O | O | | | | | 2,00 | 1,35 | |
| 4 | O | | | | | O | 1,48 | 1,21 | 7,9 |
| 5 | O | | | | O | | 1,22 | 1,22 | |
| 6 | | | | | O | O | 1,00 | 1,22 | |
| 7 | | O | | | O | | 0,82 | 1,18 | |
| 8 | | O | | | O | | 0,69 | | |
| R1 | | O | | O | | | -4,48 | | |
| R2 | | | | O | | O | -2,24 | | |

Static gear ratios:

$i\_0\_RS1 = +2,74$    $i\_ST1 = -1,0$
$i\_0\_RS2 = -2,24$    $i\_ST2 = -2,0$

MULTI-SPEED TRANSMISSION

FIELD OF THE INVENTION

The present invention concerns a multi-speed transmission.

BACKGROUND OF THE INVENTION

Several transmission schemes for automatic transmissions with a non-shiftable series assembly and a shiftable main gearset have become known in U.S. Pat. No. 5,106,352 A in which a total of six forward gears are shiftable without group shifting. The main gearset here is constructed as a two webbed four shafted transmission with two coupled planetary gearsets. The non-shiftable series assembly can be constructed as a single web planetary operation or as a two shafted transmission with two fixed spur gear pairs.

If the series assembly is constructed as a non-shiftable single web planetary transmission, then U.S. Pat. No. 5,106,352 A suggests connecting the input shaft of the automatic transmission fast with this single web planetary transmission and to transmit selectively the torque thus generated in the series assembly through various shift elements to gearset components of the main gearset. Furthermore, the input shaft is connectable with the main gearset through a shifting element. If the series assembly is constructed as a two shaft transmission with constant spur gear stages, U.S. Pat. No. 5,106,352 A suggests connecting the input shaft fast with one spur gear each of two spur gear pairs. Input shaft and output shaft of the automatic transmission are thus not coaxial in relation to each other. Two rotational speeds are generated by these two spur gear pairs that are transmittable through various shifting elements to gearset components of the main gearset.

In the older German patent application P 199 49 507.4 of the applicant, several transmission schemas for an automatic multi-speed transmission with various combinations of planetary gearsets are described. By suitable connection of a non-shiftable planetary gearset combination in a series assembly to a shiftable planetary gearset combination in a distribution side assembly, at least seven forward gears can be respectively shifted without group shifting. The number of shiftable forward gears is moreover at least twice as large as the number of shifting elements. Series assembly and distribution side assembly are constantly arranged coaxially in relation to each other.

DE-P 199 49 507.4 also suggests constructing the distribution side assembly as two webbed four shaft transmissions. Here an arrangement of two individual mechanically coupled single web planetary gearsets is to be understood by two webbed four shafted transmission in which the coupled unit has four so-called "free shafts" as a consequence of a twofold component connection, whereby a "shaft" can be a sun gear, a hollow gear or even a web of a planetary set.

The object of the present invention now consists in that, proceeding from the state of the art mentioned, to develop a multi-speed transmission with non-coaxial arrangement and at least seven forward gears shiftable without group shifting with respect to building space, with low building expenditure, favorable gear gradation and great spread.

SUMMARY OF THE INVENTION

Proceeding from the representative state of the art of U.S. Pat. No. 5,106,352 A, the multi-speed transmission has an input shaft and an output shaft not arranged coaxially in relation to it. A non-shiftable series assembly is connected with the input shaft that is constructed as a two shaft transmission with constant spur gear speeds. A shiftable main gearset is connected with the output shaft that is constructed as a two webbed four shaft transmission with two coupled, shiftable planetary gearsets.

The two spur gear speeds of the series assembly generate one output rotational speed each of which is transferable over various shifting elements through their selective closing on individual components of the planetary gearsets of the main gearset. Obviously, various component couplings can be provided within the planetary gearsets in various refinements of the main gearset.

In accordance with the invention, the multi-speed transmission has six shifting elements through the selective closing of which a total of eight forward gears and two reverse gears are shiftable. As distinct from the representative state of the art, an additional shifting element is thus provided through which two additional forward gears can be shifted. Moreover, two shifting elements are shifted in each shifted gear. In shifting from one gear into the next, only one shifting element is shifted in this connection and a further shifting element is cut in, owing to which shifting quality-critical group shiftings in which several shifting elements must be cut in and cut out at the same time are avoided.

The first free shaft of the main gearset is connected with a shifting element through which the first shaft of the main gearset is connectable with the second spur gear speed of the series assembly. In accordance with the invention, the second free shaft of the main gearset is connected with three shifting elements through which the second shaft of the main gearset is electively connectable or fixable with the first or the second spur gear speed of the series assembly. The third free shaft of the main gearset is connected with two shifting elements through which the third shaft of the main gearset is connectable of fixable with the first spur gear speed of the series assembly. The fourth free shaft of the main gearset is connected with the output shaft of the transmission.

Preferably, the first and second free shafts of the main gearset are respectively a central gear, thus, a sun gear or a hollow gear. The third free shaft of the main gearset is preferably a web.

In relation to the representative state of the art, the multi-speed transmission of the invention thus has an additional shifting element on the second shaft of the main gearset constructed as a two webbed four shaft transmission.

This construction makes possible compact, space-saving, eight gear multi-speed transmission for use with non-coaxial input and output. The multi-speed transmission of the invention constructed as such is especially suited for motor vehicles with a drive motor installed crosswise in relation to the direction of travel ("front cross drive," "rear cross drive"), or with a drive motor installed longitudinally in relation to the direction of travel and front or rear drive.

BRIEF DESCRIPTION OF THE INVENTION

The invention will now be described, by way of example, with reference to the accompanying drawings in which.

DETAILED DESCRIPTION OF THE INVENTION

The transmission schema of the multi-speed transmission is represented in the Figures with Index A corresponding to the design in question. The Figure with Index B illustrates the shifting logic associated with the design, exemplary gear ratios of the individual gears; gear gradation, transmission spread and static gear ratios.

In all Figures, an input shaft rotating with an input rotational speed n is designated with 1 and an output shaft of the multi-speed transmission rotating with an output rotational speed of n is designated with 2. ST1 and ST2 designate a first and a second spur gear speed of the series assembly, in each case with an input-side spur gear S11, S21, as well as with an output-side spur gear S12, S22, respectively. On the output side, the series assembly thus generates two different rotational speeds, namely the output speed n1 with which the output side spur gear S12 of the first spur gear speed ST1 rotates and the output rotational speed n2 with which the output side spur gear S22 of the second spur gear speed ST2 rotates. A first and a second planetary gearset of the main gearset are designated with RS1 and RS2. The component side coupling of the planetary gearset components within the main gearset is different in the designs represented by way of example. Six shifting elements A, B, C, D, E, and F are provided, whereby the shifting elements A, B, E, and F are constantly constructed as clutch and the shifting elements C, D are constantly constructed as a brake.

The first free shaft of the main gearset is connected with clutch A and rotates with closed clutch A with output rotational speed n2 of the second spur gear speed ST2. The second free shaft of the main gearset is connected with clutch B, brake C and clutch F, rotates when clutch B is closed with output rotational speed n2 of the first spur gear ST2, stands still when brake C is closed, and rotates when clutch F is closed with a rotational speed n1 of the first spur gear speed ST1. The third free shaft of the main gearset is connected with brake D and clutch E, stands still when brake D is closed and rotates with output rotational speed n1 of the first spur gear speed ST1 when clutch E is closed. The fourth free shaft of the main gearset is connected with output shaft 2 and rotates with output rotational speed nab.

In accordance with the invention, the second free shaft of the main gearset is thus, in contrast with the representative state of the art owing to the possibility of shifting the additional sixth shifting element F, electively connectable with both output side spur gears S12, S22 (output rotational speeds n1, n2) of the two spur gear speeds ST1, ST2, and not only with the output side spur gear S22 (output rotational speed n2) of the second spur gear speeds ST2.

Figures 1A, 1B:
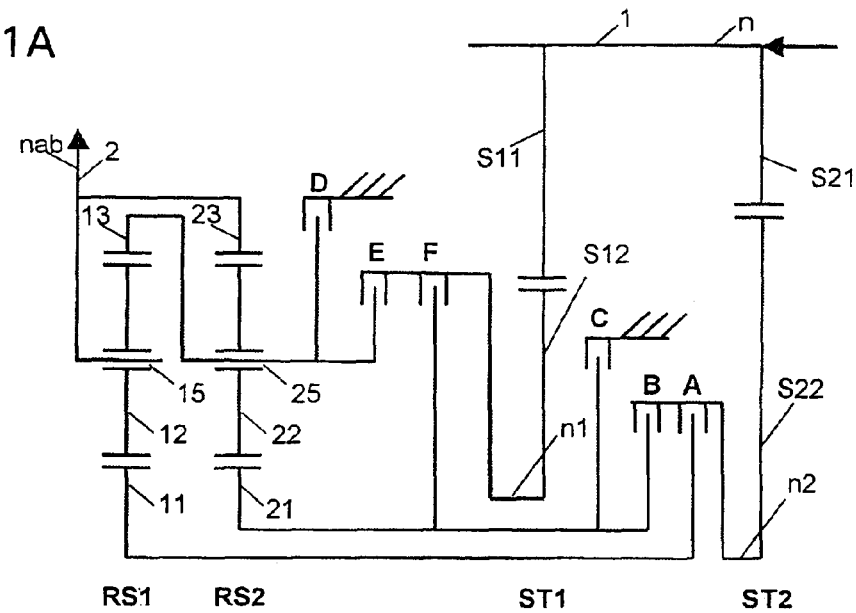
FIGS. 1A and 1B represent a first design of a multi-speed transmission of the invention.

FIG. 1A now depicts the transmission schema of an exemplary first design of a multi-speed transmission of the invention. The input shaft 1 (rotational speed n) is connected fast with input side spur gear S21 of the second spur gear speed ST2. Both planetary gearsets RS1, RS2 are constructed as minus transmissions and enclose respectively a sun gear 11, 21, a hollow gear 13, 23, as well as a web 15, 25 with planetary gears 12, 22.

The sun gear 11 of the first planetary gearset RS1 forms the first free shaft of the main gearset and is connectable with the output side spur gear S22 of the second spur gear speed ST2 through the first shifting element A. If clutch A is closed, then sun gear 11 rotates at rotational speed n2 which is calculated on the basis of the input rotational speed n of the input shaft 1 and the gear ratio of the second spur gear speed i_ST1.

The sun gear 21 of the second planetary gearset RS2 forms the second free shaft of the main gearset and is connectable with the output side spur gear S22 of the second spur gear speed ST2 through the second shifting element B, fixable through the third shifting element C, as well as with the output side spur gear S12 of the first spur gear speed ST1 through the sixth shifting element F. If the clutch B is closed, then sun gear 21 rotates at rotational speed n2 that is calculated on the basis of the input rotational speed n of the input shaft 1 and the gear ratio of the second spur gear speed i_ST2. If brake C is closed, then sun gear 21 stands still. If clutch F is closed, sun gear 21 rotates at rotational speed n1 that is calculated on the basis of the input rotational speed n of the input shaft 1 and the gear ratio of the first spur gear speed i_ST1.

Hollow gear 13 of the first planetary gearset RS1 and the web 25 of the second planetary gearset RS2 are coupled and form the third free shaft of the main gearset. They are fixable through the fourth shifting element D as well as connectable through the fifth shifting element E with the output side spur gear S12 of the first spur gear speed ST1. If brake D is closed, then hollow gear 13 and coupled web 25 stand still. If clutch E is closed, then hollow gear 13 and coupled web 25 rotate at rotational speed n1 that is calculated on the basis of the input rotational speed n of input shaft 1 and the gear ratio of the first spur gear speed i_ST1.

Hollow gear 23 of the second planetary gearset RS2 and web 15 of the first planetary gearset RS1 are coupled and form the first free shaft of the main gearset and are connected with input shaft 2 of the multi-speed transmission.

The following applies for the rotational speeds on the transmission shafts and the shifting elements:
1. The output rotational speed n1 of the first spur gear speed ST1 is equal to the input rotational speed n of input shaft 1 divided by the gear ratio i_ST1 of the first spur gear speed ST1;
2. The output rotational speed n2 of the second spur gear speed ST2 is equal to the input rotational speed n of input shaft 1 divided by the gear ratio i_ST2 of the second spur gear speed ST2;
3. The rotational speed on shifting elements A and B is equal to the output rotational speed n2 of the second spur gear speed ST1;
4. The rotational speed on shifting elements E and F is equal to output rotational speed n1 of the first spur gear speed ST2;
5. The rotational speed on the shifted shifting element C is zero;
6. The rotational speed on the shifted shifting element D is zero;
7. The rotational speed on the shaft that connects shifting elements B C, F with a central gear of the second planetary gearset RS2 is negative in relation to the rotational speed present on activated shifting element b when shifting element A and D are closed;
8. The rotational speed on the shaft that connects shifting elements B, C, F with the central gear of the second planetary gearset RS2 is greater than zero when shifting element B is shifted;
9. The rotational speed on the shaft that connects shifting elements B, C, F with a central gear of the first planetary gearset RS1 is greater than the rotational speed present when shifting element B is activated when shifting element F is shifted;
10. The rotational speed on the shaft that connects shifting element A with a central gear of the first planetary gearset RS1 is greater than the rotational speed present on activated shifting element A when shifting elements E and F are shifted;
11. The rotational speed on the shaft that connects shifting element A with the central gear of the first planetary gearset RS1 is greater than the rotational speed present on activated shifting elements E and F when shifting elements E and B are shifted;

12. The rotational speed on the shaft that connects shifting element A with the central gear of the first planetary gearset RS1 is greater than the rotational speed present on activated shifting elements E and B when shifting elements E and C are shifted;
13. The rotational speed on the shaft that connects shifting element A with the central gear of the first planetary gearset RS1 is negative in relation to the rotational speed present on activated shifting element A when shifting elements D and B are shifted;
14. The rotational speed on the shaft that connects shifting element A with the central gear of the first planetary gearset RS1 is less than the rotational speed present on activated shifting elements D and B when shifting elements D and F are shifted;
15. The rotational speed on the shaft that connects shifting element D, E with the central gear of the second planetary gearset RS2 is greater than the rotational speed present on activated shifting elements A and C when shifting elements A and B are shifted;
16. The rotational speed on the shaft that connects shifting element D, E with the central gear of the second planetary gearset RS2 is greater than the rotational speed present on activated shifting elements A and B when shifting elements A and F are shifted;
17. The rotational speed on the shaft that connects shifting element D, E with the central gear of the second planetary gearset RS2 is greater than the rotational speed present on activated shifting elements A and F when shifting element E is shifted.

As shown in FIG. 1B, a total of eight forward gears and two reverse gears are shiftable in the first design of the multi-speed transmission of the invention without comfort-critical group shifting with comparatively great spread and very harmonious gradation. Advantageously the starting ratio in the first forward gear and in the first reverse gear is great so that a torque converter can be spared as starting element when used as a passenger car automatic transmission. The seventh and eighth forward gear is constructed drive rotational speed-reducing as an overdrive gear. The non-coaxial component arrangement of input and output shaft and the compact construction of the multi-speed transmission are advantageous in a familiar manner for a use in motor vehicles with drive motors arranged crosswise in relation to the direction of travel.

As likewise shown in FIG. 1B, the output side spur gear S12 of the first spur gear speed ST1 (rotational speed n1) with (negative) rotational speed n of input shaft 1 (i_ST1=−1.0) in the first exemplary design of the multi-speed transmission of the invention and the output side spur gear S22 of the second spur gear speed ST2 (rotational speed n2) with (negative) half rotational speed n of input shaft 1 (i_ST2=−2.0). Other gear ratios of the two spur gear speeds ST1, ST2 can obviously be provided in other constructions of the series assembly.

Figures 2A, 2B:
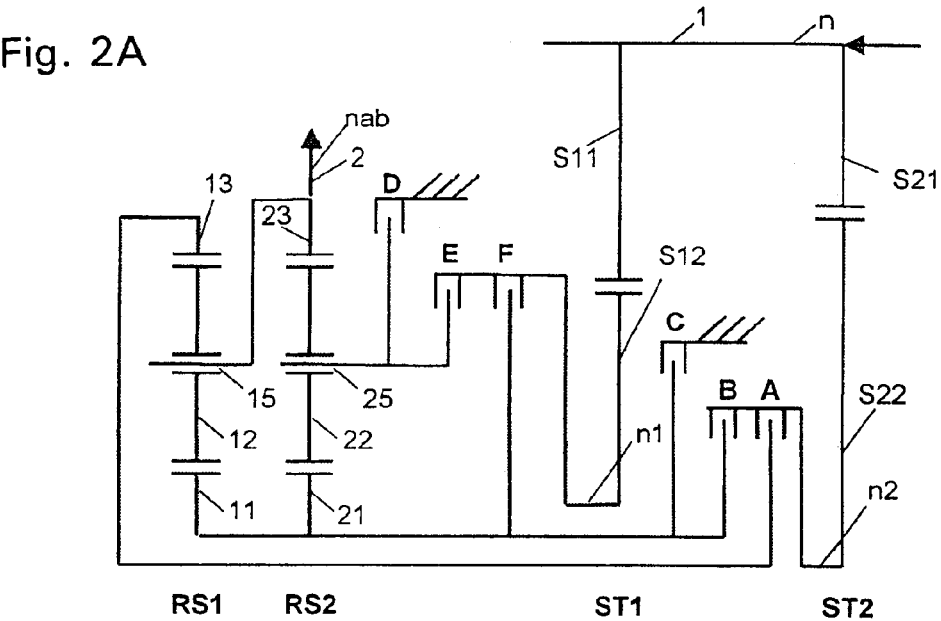
FIGS. 2A and 2B represent a second design of a multi-speed transmission of the invention.

Now a second exemplary design of a multi-speed transmission of the invention is explained on the basis of FIGS. 2A and 2B. FIG. 2A illustrates the transmission schema of this second design. In distinction from the previously described first design, only the coupling of the gearset components of the main gearset and its attachment to the individual shifting elements are modified. Shifting logic and exemplary static ratios and gear steps of the second design are represented in FIG. 2B that are identical to the representation in FIG. 1B corresponding to the modifications mentioned in relation to the first design.

As represented in FIG. 2A, the first free shaft of the main gearset constructed as a two webbed four shaft transmission continues to be formed by a central gear of the first planetary gearset RS1, henceforth, however, by its hollow gear 13. Hollow gear 13 of the first planetary gearset RS1 is hence connectable with the output side spur gear S22 (rotational speed n2) of the second spur gear speed ST2 through clutch A. The second free axle of the main gearset is henceforth formed by the two coupled sun gears 11, 21 of planetary gearsets RS1, RS2 and is connectable with the output side spur gear S22 (rotational speed n2) of the second spur gear speed ST2 through clutch B, as well as with the output side spur gear S12 (rotational speed n1) of the first spur gear speed ST1 through clutch F. The third free shaft of the main gearset is henceforth formed by the web 25 with planetary gears 22 of the second planetary gearset RS and is fixed unaltered through brake D as well as with the output side spur gear S12 (rotational speed n1) of the first spur gear speed ST1 through brake D.

In relation to the first design described, with the second design of a multi-step transmission of the invention, the main gearset is more favorable in terms of industrial engineering owing to coupling the components of the two sun gears 11, 12.

Figures 3A, 3B:
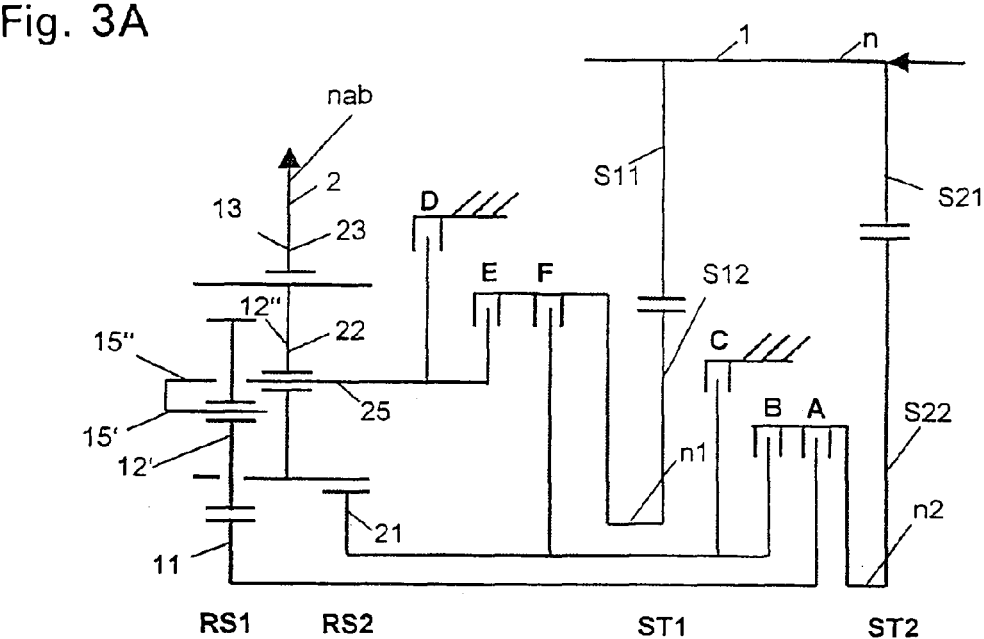
FIGS. 3A and 3B represent a third design of a multi-speed transmission of the invention.

FIG. 3A represents the transmission schema of a third design of a multi-speed transmission of the invention. As distinct from the previously described designs one and two, the main gearset is henceforth constructed as a Ravigneaux gearset with the known advantages regarding construction space.

As represented in FIG. 3A, the first planetary gearset RS1 is constructed as a positive transmission and has two coupled webs 15', 15" with inner planetary gears 12' and outer planetary gears 12". These coupled webs 15', 15" are connected as a first clutch inside the main gearset with web 25 of planetary gears 22 of the second planetary gearset RS2, whereby the outer planetary gears 12' of the first planetary gearset RS1 and the planetary gears 22 of the second planetary gearset RS2 are combined. The hollow gears 13 and 23 of both planetary gearsets RS1, RS2 are consequently likewise combined and form the second clutch inside the main gearset.

The attachment of the free shafts of the Ravigneaux gearset to the two spur gear speeds ST1 and ST2 corresponds to that in FIG. 1A. The output rotational speed n2 of the second spur gear speed ST2 is thus connectable with the sun gear 11 of the first planetary gearset RS1 (as a central gear of the first planetary gearset RS1) through clutch A and with sun gear 21 of the second planetary gearset RS2 (as a central gear of the second planetary gearset RS2) through clutch B. Furthermore, the output rotational speed n1 of the first spur gear speed ST1 is connectable with the coupled webs 15', 15", 25 of the two planetary gearsets RS1, RS2 through clutch E and in accordance with the invention with sun gear 21 of the second planetary gearset RS2 (as a central gear of the second planetary gearset RS2) through clutch F. Sun gear 21 is connectable unchanged through brake C and the coupled webs 15', 15", 25 through brake D.

Shifting logic and exemplary static gear ratios and gear steps of the third design are represented in FIG. 2B. Compared with the previously described designs one and two, the gear ratios of the individual gears show minor deviations and the spread is somewhat larger.

Obviously other planetary gearset combinations inside the main gearset can also be provided, in which, for example, the first or the second shaft of the main gearset constructed as a two webbed four shaft transmission is formed by a web of the first or second planetary gearset RS1 or RS2.

In another construction of the multi-speed transmission of the invention, three coupled, switchable planetary gearsets can also be provided in the main gearset whereby it can also be appropriate (according to the coupling of these three planetary gearsets) to provide a third spur gear speed that is connected on the input side fast with the input shaft and generates a third output rotational speed that is in addition transferable to the main gearset. In this way, compact multiple gear multi-speed transmissions with comparably small axial extent can be constructed.

In another construction of a multi-speed transmission of the invention, connecting the main gearset constructed as a two webbed four shaft transmission downstream in series to a distribution side assembly can also be provided. This distribution side assembly can be non-shiftable or shiftable through at least one additional shifting element, or be constructed from several coupled distribution side assembly planetary gearsets.

| Reference numbers | |
|---|---|
| 1 | Input shaft |
| 2 | Output shaft |
| 11 | Sun gear of the first planetary gearset |
| 12 | Planetary gear of the first planetary gearset |
| 13 | Hollow gear of the first planetary gearset |
| 15 | Web of the first planetary gearset |
| 21 | Sun gear of the second planetary gearset |
| 22 | Planetary gear of the second planetary gearset |
| 23 | Hollow gear of the second planetary gearset |
| 25 | Web of the second planetary gearset |
| A, B, C, D, E, F | First to sixth shifting element |
| RS1 | First planetary gearset of the main gearset |
| RS2 | Second planetary gearset of the main gearset |
| ST1 | First spur gear speed of the series assembly |
| ST2 | Second spur gear speed of the series assembly |
| S11 | Input side spur gear of the first spur gear speed |
| S12 | Output side spur gear of the first spur gear speed |
| S21 | Input side spur gear of the second spur gear speed |
| S22 | Output side spur gear of the second spur gear speed |
| i_ST1 | Gear ratio of the first spur gear speed |
| i_ST2 | Gear ratio of the second spur gear speed |
| n | Rotational speed of the input shaft |
| nab | Rotational speed of the output shaft |
| n1 | Output rotational speed of the first spur gear speed |
| n2 | Output rotational speed of the second spur gear speed |

What is claimed is:

1. A multi-speed transmission with an input shaft (1) and an output shaft (2); two spur gear speeds (ST1, ST2) that are connected, on an input side, with the input shaft (1) rotating at an input rotational speed (n) for generating two output rotational speeds (n1, n2), a main gearset that is connected with the output shaft (2) and constructed as a two webbed four shaft transmission with two coupled, shiftable planetary gearsets (RS1, RS2) to which the output rotational speeds (n1, n2) of the spur gear speeds (ST1, ST2) are transferable by selective engagement of several shifting elements (A to E) such that, for shifting from one gear into a next higher or a next lower gear by shifting element activation, only one shifting element is disengaged and a further shifting element is engaged, whereby the output rotational speed (n2) of the second spur gear speed (ST2) is transferable by a first shifting element (A) to a first free shaft of the main gearset and by a second shifting element (B) to a second shaft of the main gearset, and the output rotational speed (n1) of the first spur gear speed (ST1) is transferable by a fifth shifting element (E) to a third shaft of the main gearset, the second shaft of the main gearset is prevented from rotating by a third shifting element (C) and the third shaft of the main gearset is prevented from rotating by a fourth shifting element (D), and a fourth free shaft of the main gearset is connected with the output shaft (2);

wherein a total of six shifting elements (A to F) are provided, the output rotational speed (n1) of the first spur gear speed (ST1) is transferable by a sixth shifting element (F) to the second shaft of the main gearset, and at least eight forward gears and two reverse gears are shiftable;

a hollow gear (13) of the first planetary gearset (RS1) forms the first free shaft of the main gearset and is connectable with an output side spur gear (S22) of the second spur gear speed (ST2) through the first shifting element (A);

a sun gear (11) of the first planetary gearset (RS1) and a sun gear (21) of the second planetary gearset (RS2) are coupled to one another and form the second free shaft of the main gearset and are connectable with the output side spur gear (S22) of the second spur gear speed (ST2) by the second shifting element (B), as well as are connectable by the sixth shifting element (F) with an output side spur gear (S12) of the first spur gear speed (ST1), and prevented from rotating by the third shifting element (C);

a web (25) and associated planetary gears (22) of the second planetary gearset (RS2) form the third free shaft of the main gearset which is prevented from rotating by the fourth shifting element (D) and is connectable with the output side spur gear (S12) of the first spur gear speed (ST1) by the fifth shifting element (E); and a hollow gear (23) of the second planetary gearset (RS2) and web (15) along with associated planetary gears (12) of the first planetary gearset (RS1) are coupled to one another and form the fourth free shaft of the main gearset and are connected with the output shaft (2).

2. The multi-speed transmission according to claim 1, wherein the output rotational speed (n1) of the first spur gear speed (ST1) is at least approximately equal to the input rotational speed (n) of the input shaft (1).

3. The multi-speed transmission according to claim 1, wherein the output rotational speed (n2) of the second spur gear speed (ST2) is at least approximately equal to the input rotational speed (n) of the input shaft (1).

4. The multi-speed transmission according to claim 1, wherein one of a non-shiftable distribution side assembly and an assembly shiftable through at least one additional shifting element is connected downstream in series from the main gearset with one of a distribution side planetary gearset or several coupled distribution side planetary gearsets.

5. A multi-speed transmission with an input shaft (1) and an output shaft (2); two spur gear speeds (ST1, ST2) that are connected, on an input side, with the input shaft (1) rotating at an input rotational speed (n) for generating two output rotational speeds (n1, n2), a main gearset that is connected with the output shaft (2) and constructed as a two webbed four shaft transmission with two coupled, shiftable planetary gearsets (RS1, RS2) to which the output rotational speeds (n1, n2) of the spur gear speeds (ST1, ST2) are transferable by selective engagement of several shifting elements (A to E) such that, for shifting from one gear into a next higher or a next lower gear by shifting element activation, only one shifting element is disengaged and a further shifting element is engaged, whereby the output rotational speed (n2) of the second spur gear speed (ST2) is transferable by a first shifting element (A) to a first free shaft of the main gearset and by a second shifting element (B) to a second shaft of the main gearset, and the output rotational speed (n1) of the first spur gear speed (ST1) is transferable by a fifth shifting element (E) to a third shaft of the main gearset, the second shaft of the main gearset is prevented from rotating by a third shifting element (C) and the third shaft of the main gearset is prevented from rotating by a fourth shifting element (D), and a fourth free shaft of the main gearset is connected with the output shaft (2);

wherein a total of six shifting elements (A to F) are provided, the output rotational speed (n1) of the first spur gear speed (ST1) is transferable by a sixth shifting element (F) to the second shaft of the main gearset, and at least eight forward gears and two reverse gears are shiftable;

a sun gear (11) of the first planetary gearset (RS1) forms the first free shaft of the main gearset and is connectable with an output side spur gear (S22) of the second spur gear speed (ST2) by the first shifting element (A);

a sun gear (21) of the second planetary forms the second free shaft of the main gearset and is connectable with the output side spur gear (S22) of the second spur gear speed (ST2) by the second shifting element (B), which is prevented from rotating by the third shifting element (C), and is connectable by the sixth shifting element (F) with an output side spur gear (S12) of the first spur gear speed (ST1);

two coupled webs (15', 15") with inner and outer planetary gears (12', 12") of the first planetary gearset (RS1) and a web (25) with associated planetary gears (22) of the second planetary gearset (RS2) are coupled with one another and form the third free shaft of the main gearset and are prevented from rotating by the fourth shifting element (D), are connectable with the output side spur gear (S12) of the first spur gear speed (ST1) by the fifth shifting element (E), whereby the outer planetary gears (12") of the first planetary gearset (RS1) and the planetary gears (22) of the second planetary gearset (RS2) are combined; and a hollow gear (13) of the first planetary gearset (RS1) and a hollow gear (23) of the second planetary gearset (RS2) are combined with one another and form the fourth free shaft of the main gearset and are connected with the output shaft (2).

6. The multi-speed transmission according to claim 5, wherein the output rotational speed (n1) of the first spur gear speed (ST1) is at least approximately equal to the input rotational speed (n) of the input shaft (1).

7. The multi-speed transmission according to claim 5, wherein the output rotational speed (n2) of the second spur gear speed (ST2) is at least approximately equal to the input rotational speed (n) of the input shaft (1).

8. The multi-speed transmission according to claim 5, wherein one of a non-shiftable distribution side assembly and an assembly shiftable through at least one additional shifting element is connected downstream in series from the main gearset with one of a distribution side planetary gearset or several coupled distribution side planetary gearsets.

* * * * *